Patented Oct. 29, 1929

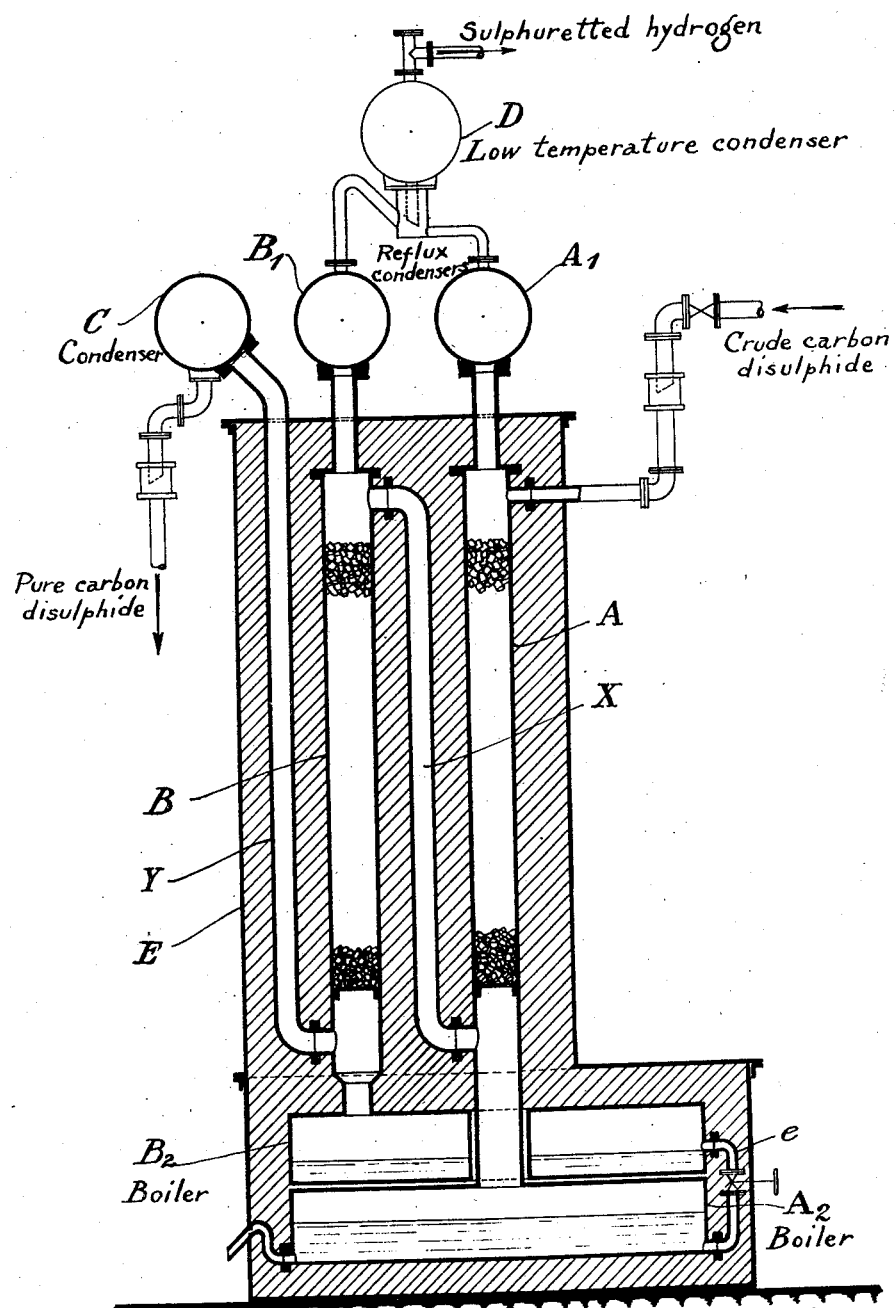

1,733,171

UNITED STATES PATENT OFFICE

PHILIPP SIEDLER, OF GRIESHEIM-ON-THE-MAIN, AND EUGEN SCHULTE, OF SCHWAN-HEIM-ON-THE-MAIN, GERMANY, ASSIGNORS TO THE FIRM I. G. FARBENINDUSTRIE, AKTIENGESELLSCHAFT, OF FRANKFORT-ON-THE-MAIN, GERMANY

PROCESS FOR REFINING RAW CARBON DISULPHIDE

Application filed October 11, 1926, Serial No. 141,020, and in Germany October 24, 1925.

This invention relates to the refining of the raw carbon disulphide obtained by the usual processes. Hitherto such refining was preferably effected either by chemical means or by fractional distillation from a boiler or the like apparatus, or by both means. Recently it has been attempted to accomplish a continuous treatment by means of rectifying-columns in combination with other physical or chemical refining methods. Hereby one has, it is true, succeeded in removing the main quantity of sulphuretted hydrogen and other volatile contaminations, and, at the same time, recovering the sulphur copiously contained in the raw product and also the non-volatile sulphurous compounds which might be present; however this result could only be attained by withdrawing, from the boiler, a highly concentrated carbon disulphide solution of these substances, without accomplishing the separation up to the obtainment of molten sulphur, which could immediately be reused in the further production of carbon disulphide. This aim has, owing to the difficulty in reaching it, not yet been attained. This is, as we have recognized, due to the fact that carbon disulphide, even if not preserved under water, is generally saturated to a greater or less extent with water. At temperatures of about 100° C. or more required for obtaining molten sulphur, dissolved or molten sulphur already reacts to a certain extent with water, forming sulphuretted hydrogen, by which the carbon disulphide to be subjected to distillation is again permanently contaminated.

By our present invention we have succeeded in overcoming this difficulty. This invention is carried out as follows:—For refinding the raw carbon disulphide merely according to the principles of rectification, two columns are used in such a manner that in the first column (A) only a previously purified carbon disulphide as distillate is contemplated, whereas in the second column (B) from the previously refined product quite pure carbon disulphide as distillate, and simultaneously only a little carbon disulphide containing sulphur as a boiling liquid in the boiler is obtained which liquid is then transferred to the boiler of the column A. As the boiling-point of this solution approximates that of pure carbon disulphide, and at this temperature sulphur does not yet react with the traces of water always present, the carbon disulphide distilling off from B can no more be contaminated by sulphuretted hydrogen.

For carrying out this process it is further important that the carbon disulphide vapors distilling off from the columns are withdrawn in the proximity of the bottom ends of the columns and thence are again conveyed to the top for further treatment, i. e. from A to the top of B, and from B to an elevated device for condensing the pure final product. The connecting conduit-pipes form communicating vessels with the corresponding columns, in which vessels the carbon disulphide vapors must be approximately equilibrated if during the distillation currents possibly detrimental to the rectifying action are to be prevented.

A further important requirement is that the gases escaping from the two reflux-condensers above the columns A and B, substantially consisting of sulphuretted hydrogen and other volatile sulphurous compounds, besides a little carbon disulphide, are jointly conveyed to a low-temperature condenser arranged above the reflux-condenser from which low-temperature condenser on the one hand, the remaining part of the carbon disulphide here condensed is conveyed to column A, and, on the other hand, the waste gases are conducted away for further use.

In its continuous course the rectification takes place in the manner hereafter described, reference being had to the single figure of the annexed drawing in which a refining plant for carrying out our present invention is diagrammatically illustrated. The column A is irrigated with carbon disulphide. The warm gases entering from below expel the sulphuretted hydrogen and other easily volatile parts to the reflux-condenser $A_1$ by which the main part of the carbon disulphide carried along with them is separated from the gases and flows back to A. The last parts of carbon disulphide contained in the sulphuretted hydrogen are separated in the elevated low-temperature condenser D, whence they are, combined with the carbon disulphide parts eventually arriving at D from $B_1$ conducted back to A for irrigating purposes. Carbon disulphide vapor nearly free from sulphuretted hydrogen and still containing small quantities of sulphur boils through pipe X to the top of B; the carbon disulphide solution enriched with sulphur runs further through A to the boiler $A_2$ in which a temperature above 120° C., i. e. above the melting-point of B-sulphur is maintained, so that continuously or intermittently liquid sulphur showing, on an average, a purity of about 98 per cent may be withdrawn from the still. The vapors entering at B from X are, for the most part, condensed by $B_1$; the remaining part of sulphuretted hydrogen passes to D through $B_1$. During its passage through B, the boiling-point of pure carbon disulphide it attained in the proximity of the lower end of the column; the quite pure carbon disulphide vapors are here conducted up to the condenser C through pipe Y. In this way a carbon disulphide solution the boiling-point of which surpasses that of the pure product only by a few degrees and containing a small percentage of sulphur arrives at the boiler $B_2$. This solution is continuously or intermittently used with others to feed $A_2$ through pipe e. Preferably the still $B_2$ is placed above $A_2$ and constructed to form an annular space around the bottom end of A.

For heating the boilers $A_2$ and $B_2$ any known device may be employed. Preferably the columns and boilers are surrounded by a jacket E to form a unity which may be insulated outwardly by a suitable bad conductor of heat.

According to our improved process we thus obtain continuously and in a merely physical way:—Purest carbon disulphide with practically quantitative output; sulphuretted hydrogen in combination with other volatile by-products in a highly concentrated form; sulphur together with non-volatile contaminations in the form of a molten mass which may be immediately reused for the production of carbon disulphide.

We claim:—

1. Process of refining raw carbon disulphide, comprising irrigating with raw carbon disulphide a first column provided with a reflux-condenser, the boiler of which is kept at temperatures above 120° C., and irrigating with the previously purified carbon disulphide supplied from the said column, a similar second column the boiler of which is kept at a temperature somewhat above the boiling-point of pure carbon disulphide.

2. In the process of refining raw carbon disulphide according to claim 1, further jointly cooling the waste gases escaping from the reflux-condensers of both the columns and using the carbon disulphide thus obtained for again irrigating the first column.

3. Process of refining raw carbon disulphide, comprising irrigating with raw carbon disulphide a first column provided with a reflux-condenser, the boiler of which is kept at temperatures above 120° C., irrigating with the previously purified carbon disulphide supplied from the said column a similar second column the boiler of which is kept at a temperature somewhat above the boiling-point of pure carbon disulphide, withdrawing the carbon disulphide vapors from the first and second columns in the proximity of their lower ends, and conducting the vapors at least up to the level of the upper end of the columns before allowing them to condense.

In testimony whereof we affix our signatures.

PHILIPP SIEDLER.
EUGEN SCHULTE.